United States Patent
Tsubouchi et al.

(10) Patent No.: US 7,032,380 B2
(45) Date of Patent: Apr. 25, 2006

(54) MASTER CYLINDER

(75) Inventors: Kaoru Tsubouchi, Toyota (JP); Katsuhiro Mita, Gamagoori (JP); Koji Suzuki, Okazaki (JP)

(73) Assignee: Advics Co., Ltd., Aichi (JP)

( * ) Notice: Subject to any disclaimer, the term of this patent is extended or adjusted under 35 U.S.C. 154(b) by 0 days.

(21) Appl. No.: 10/897,085

(22) Filed: Jul. 23, 2004

(65) Prior Publication Data

US 2005/0016174 A1 Jan. 27, 2005

(30) Foreign Application Priority Data

Jul. 23, 2003 (JP) ............................. 2003-278389

(51) Int. Cl.
*B60T 11/20* (2006.01)
*F15B 7/08* (2006.01)

(52) U.S. Cl. .......................................... 60/588; 60/562
(58) Field of Classification Search ................. 60/562, 60/585, 588
See application file for complete search history.

(56) References Cited

U.S. PATENT DOCUMENTS

| | | | |
|---|---|---|---|
| 1,943,886 A * | 1/1934 | Carroll ........................ | 60/562 |
| 4,939,901 A * | 7/1990 | Saalbach et al. .............. | 60/562 |
| 5,617,725 A * | 4/1997 | Yasuda ........................ | 60/562 |
| 6,463,737 B1 * | 10/2002 | Inoue et al. .................. | 60/562 |
| 6,467,268 B1 * | 10/2002 | Nakano et al. ............... | 60/562 |
| 6,694,732 B1 * | 2/2004 | Tsubouchi .................... | 60/562 |

FOREIGN PATENT DOCUMENTS

| | | |
|---|---|---|
| JP | 10-513413 | 12/1998 |
| JP | 2002-104162 | 4/2002 |

* cited by examiner

*Primary Examiner*—Edward K. Look
*Assistant Examiner*—Michael Leslie
(74) *Attorney, Agent, or Firm*—Buchanan Ingersoll PC

(57) ABSTRACT

A brake master cylinder includes a cylinder body having a circumferential groove formed therein. A primary cup is received in the groove and supported axially by a rear wall defined by the groove. A primary piston is inserted in the cylinder body in sliding contact with the primary cup. The rear wall has a radially inner surface formed with a plurality of grooves. A passage leading to a reservoir is provided in the rear of the grooves. The piston is formed with radial through holes corresponding to the grooves. When the piston is at the return end of its stroke, the pressure chamber defined in the cylinder body can communicate with the reservoir through the radial through holes, the grooves and the passage.

9 Claims, 2 Drawing Sheets

MASTER CYLINDER

BACKGROUND OF THE INVENTION

This invention relates to a master cylinder comprising a cylinder body, and a piston slidably mounted in the bore of the cylinder body while kept in slide contact with a cup fitted in the inner wall of the bore.

This type of master cylinder, which is typically used in a hydraulic brake system for a vehicle, has a pressure chamber into which brake fluid is adapted to be sucked from a reservoir. A primary cup or seal ring is in slide contact with the piston. In one conventional arrangement, brake fluid is sucked into the pressure chamber through a passage formed by elastically deforming the primary cup under the pressure of the brake fluid. When deforming the primary cup, the fluid encounters large resistance. This of course hinders smooth flow of brake fluid from the reservoir into the pressure chamber. Among brake systems including an electronic control unit for controlling brake hydraulic pressure, there are ones of the type in which brake fluid is sucked from the reservoir into the brake circuit through the pressure chamber. It is desired that the master cylinder used in this type of brake system be especially low in such suction resistance.

JP patent publications 10-513413 (Publication 1) and 2002-104162 (Publication 2) disclose master cylinders of the abovementioned type in which brake fluid is adapted to be sucked into the pressure chamber through a passage bypassing the primary cup so that brake fluid can be sucked without encountering any major resistance.

The master cylinder of Publication 1 includes a piston having an annular groove formed in its radially outer surface and lateral (radial) holes through which the annular groove communicates with the bore of the piston, which is a portion of the pressure chamber. The annular groove is formed in the piston at such a position that while the piston is not being operated, it is disposed behind the primary cup so as to communicate with a passage leading to the reservoir. Thus, while the piston is not being operated, the pressure chamber is in communication with the reservoir through the lateral holes and the annular groove, while bypassing the primary cup. Brake fluid can thus be smoothly sucked into the pressure chamber without encountering any major resistance.

The master cylinder of Publication 2 has a primary cup and a spacer both axially slidably fitted around the piston with the spacer disposed behind the primary cup. A guide member is further provided behind the spacer. The guide member is formed with a passage leading to the reservoir. The piston is formed with radial ports communicating with the pressure chamber. While the piston is not being operated, the radial ports communicate with the passage formed in the guide member, with their openings partially closed by the spacer and the primary cup. When a negative pressure is produced in the pressure chamber in this state, the primary cup and the spacer are pulled forward under the negative pressure produced in the pressure chamber. Thus, as soon as a negative pressure is produced in the pressure chamber, brake fluid can be smoothly sucked into the pressure chamber from the reservoir through the passage formed in the guide member and the radial holes because the primary cup and the spacer move away from the openings of the radial ports.

While the master cylinder disclosed in Publication 1 is simple in structure, the primary cup tends to be damaged by the edges of the annular groove when the piston slides. This may lead to premature breakdown of the seal.

The master cylinder produces pressure only after the piston has moved a distance corresponding to the width of the annular groove from its initial position. Since the annular groove has to have a width greater than the diameter of the lateral holes, the piston has to be moved a relatively long distance until the master cylinder produces pressure.

The piston disclosed in Publication 2 has no such annular groove, so that the master cylinder of Publication 2 is free of either of the above problems. But the master cylinder of Publication 2 needs the spacer and the guide member. The guide member has to be formed with the passage leading to the reservoir. In order to mount the spacer and the guide member, the cylinder body has to be formed of two separate members. All these factors extremely complicate the structure of the entire master cylinder.

There has been no conventional master cylinder that is free of either of the abovementioned two problems the master cylinder of Publication 1 has, and also does not need extra components such as the spacer and the guide member as required in the master cylinder of Publication 2.

An object of the invention is to provide a master cylinder that is simple in structure, can minimize the stroke of the piston required to seal the port, and minimize the possibility of the primary cup getting damaged.

SUMMARY OF THE INVENTION

According to the present invention, there is provided a master cylinder comprising a cylinder body, a first primary cup provided on a radially inner surface of the cylinder body, a primary piston inserted in the cylinder body so as to be kept in slide contact with the first primary cup, the cylinder body having a first rear wall supporting the first primary cup, the first rear wall having a radially inner surface formed with a plurality of grooves, a reservoir, and a first passage provided in the rear of the grooves and communicating with the reservoir, the primary piston being formed with first radial through holes corresponding to the grooves, wherein a first pressure chamber defined in the cylinder body is adapted to communicate with the reservoir through the first radial through holes, the grooves and the first passage when the primary piston is at a return end of its stroke.

The passage may be an annular groove formed in the inner surface of the cylinder body.

The number of the grooves is preferably neither a multiple nor a factor of the number of the radial through holes. Further, the grooves and the through holes are positioned and sized such that at least one of the grooves is always in communication with one of the through holes even when the piston rotates.

The master cylinder may be a tandem master cylinder having a primary piston and a secondary piston. Such a tandem master cylinder further comprises a secondary cup for the primary piston, a secondary piston inserted in the cylinder body in front of the primary piston, and a pressure cup and a second primary cup both for the secondary piston, the cylinder body having, on the radially inner surface thereof, first and third piston guide portions directly in slide contact with the primary piston for guiding the primary piston, fourth and sixth piston guide portions directly in slide contact with the secondary piston for guiding the secondary piston, and a second rear wall supporting the second primary cup, the first rear wall and the second rear wall serving as second and fifth piston guide portions for guiding the primary piston and the secondary piston, respectively, the secondary cup being provided in the rear of the first rear wall, the first piston guide portion being provided between the secondary cup and the first rear wall, the third piston guide portion being provided in front of the first primary cup, the pressure cup being provided in the rear of the second rear wall, the fourth piston guide portion being provided between the second rear wall and the pressure cup, the sixth piston guide portion being provided in front of the second primary cup, the second rear wall having a radially inner surface formed with a plurality of grooves, the master cylinder further comprising a second passage provided in the rear of the grooves of the second rear wall so as to communicate with the reservoir, the secondary piston being formed with second radial through holes corresponding to the grooves of the second rear wall, wherein a second pressure chamber defined in the cylinder body in front of the first pressure chamber is adapted to communicate with the reservoir through the second radial through holes, the grooves of the second rear wall and the second passage when the secondary piston is at a return end of its stroke, each of the first, third, fourth and sixth piston guide portions having a radially inner surface formed with a plurality of grooves, the grooves formed in the first to sixth piston guide portions extending parallel to an axis of the cylinder body.

BRIEF DESCRIPTION OF THE DRAWINGS

Other features and objects of the present invention will become apparent from the following description and the accompanying drawings, in which.

DETAILED DESCRIPTION OF THE PREFERRED EMBODIMENT

Figure 1:
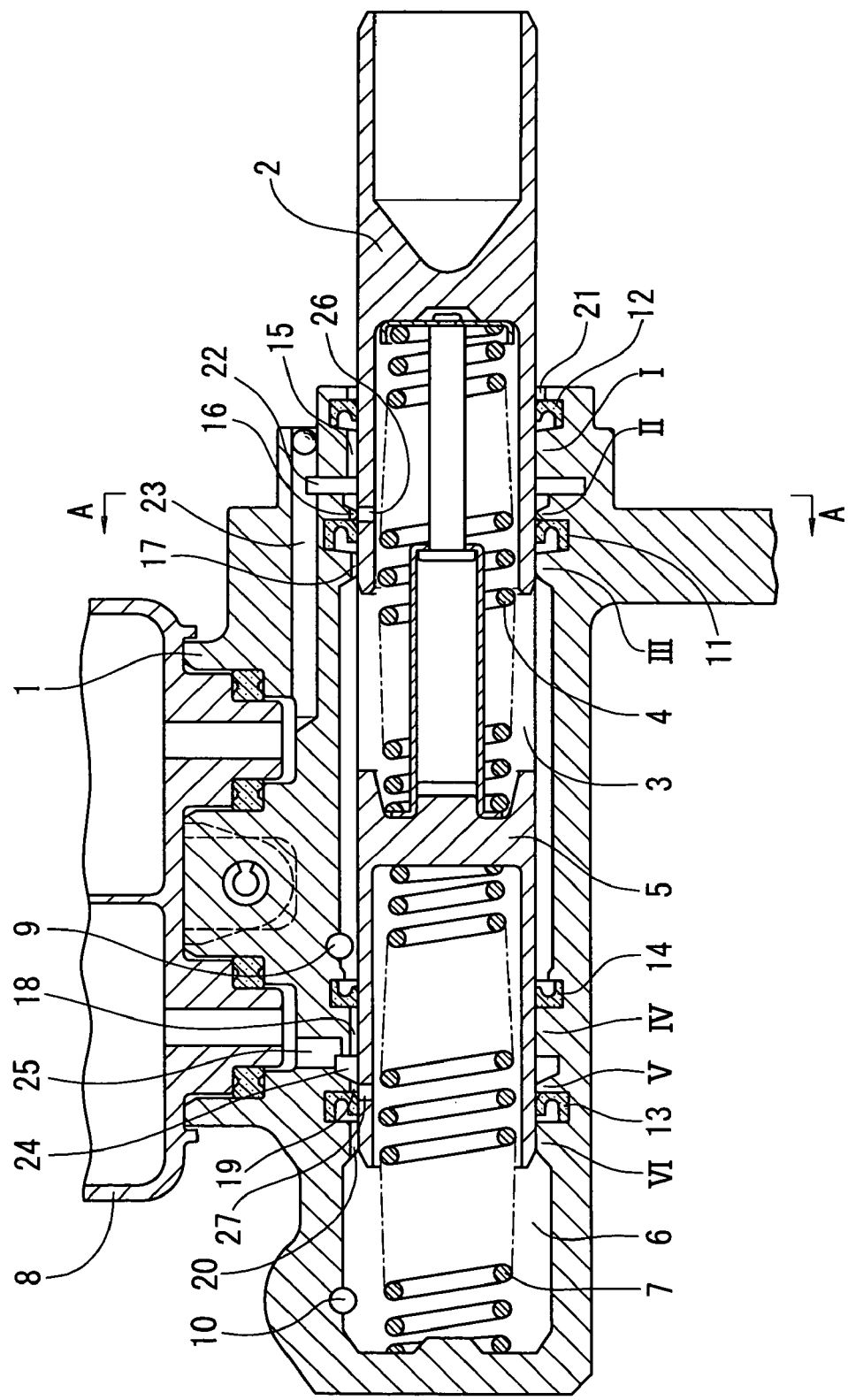
FIG. 1 is a sectional view of a master cylinder embodying the present invention.
Figure 2:
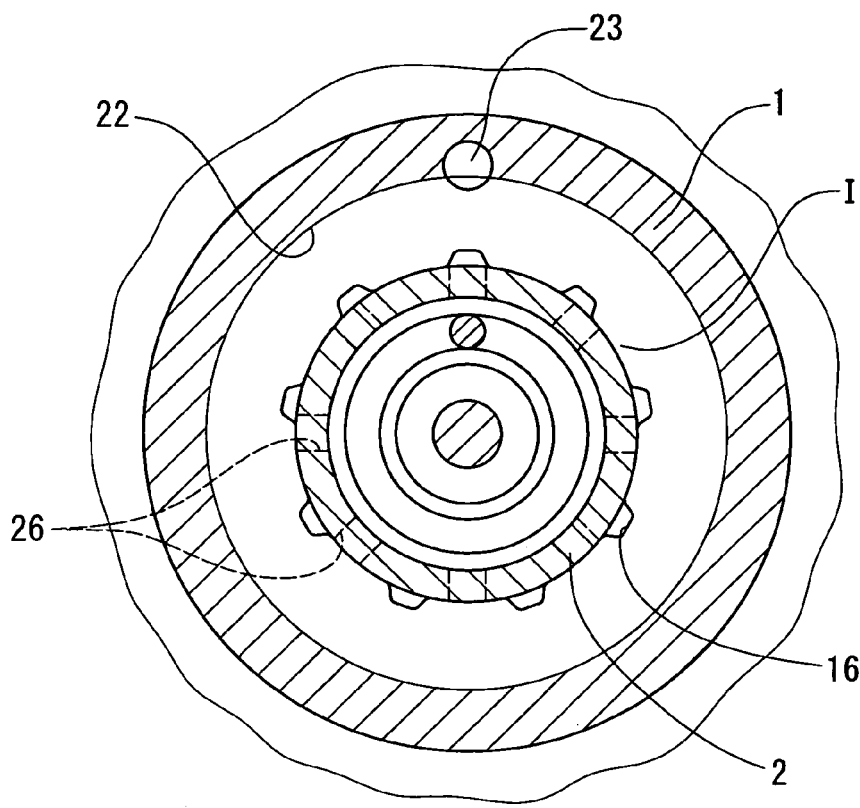
FIG. 2 is a enlarged sectional view taken along line A—A of FIG. 1.
Figure 3:
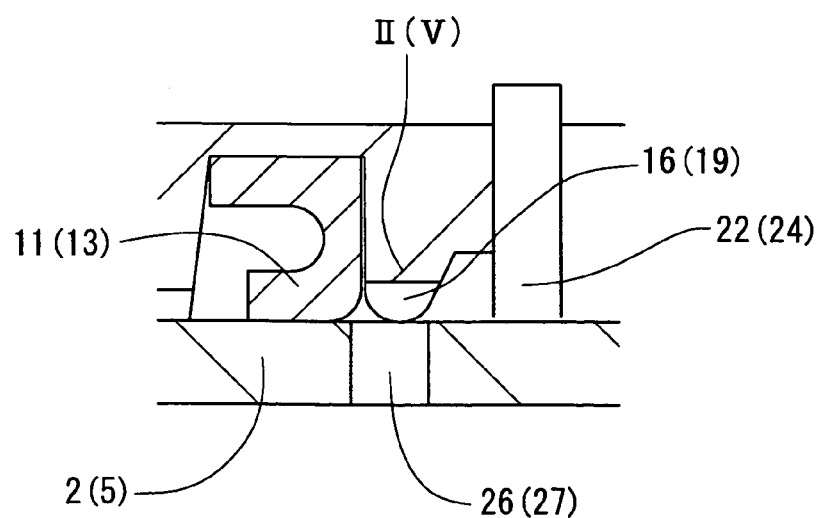
FIG. 3 is an enlarged sectional view of the master cylinder of FIG. 1, showing one of the through holes formed in the piston and the annular groove.

Now referring to FIGS. 1–3, the master cylinder embodying the present invention includes a cylinder body 1, a primary piston 2 slidably mounted in the cylinder body 1, a secondary piston 5 slidably mounted in the cylinder body 1 forwardly (leftwardly in FIG. 1) of the primary piston 2, and a reservoir 8. A first pressure chamber 3 is defined in the cylinder body 1 between the primary piston 2 and the secondary piston 5. The first pressure chamber 3 is filled with brake fluid which is pressurized by the primary piston 2 to generate a brake pressure. A return spring 4 for the primary piston 2 is mounted in the first pressure chamber 3. A second pressure chamber 6 is defined in the cylinder body 1 between the end wall of the cylinder body 1 and the secondary piston 5 and is filled with brake fluid which is pressurized by the secondary piston 5. The first pressure chamber 3 has an output port 9. The second pressure chamber 6 has an output port 10.

Fitted in the inner peripheral surface of the cylinder body 1 are four cup members, i.e. a primary cup 11 pressed against the outer periphery of the primary piston 2 to seal the outer periphery of the piston 2, a secondary cup 12 pressed against the outer periphery of the primary piston 2 to shut off communication between the interior of the cylinder body 1 and the outer air, a primary cup 13 pressed against the outer periphery of the secondary piston 5 to seal the outer periphery of the piston 5, and a pressure cup 14 pressed against the secondary piston 5 to shut off communication between the first pressure chamber 3 and the reservoir 8.

On its inner peripheral surface, the cylinder body 1 is formed with three piston guide portions I, II and III for guiding the primary piston 2, and three other piston guide portions IV, V and VI for guiding the secondary piston 5. The guide portions I–VI have inner diameters slightly greater than the outer diameter of the primary and secondary pistons 2 and 5, and are substantially in slide contact with the pistons 2 and 5 to guide their sliding movement.

The piston guide portion I, which is located closest, of the above six piston guide portions, to the right-hand (in FIG. 1) opening of the cylinder body 1, is provided forwardly (leftwardly in FIG. 1) of the secondary cup 12. The piston guide portions II and III sandwich the primary cup 11 from back and front of the cup 11, respectively.

The piston guide portion IV is located forward of the pressure cup 14. The piston guide portions V and VI sandwich the primary cup 13 from back and front of the cup 13, respectively.

The piston guide portions II and V, which are located immediately behind the primary cups 11 and 13, respectively, may have slightly (e.g. about 0.1 mm) greater inner diameters than the other piston guide portions so that brake fluid can be smoothly drawn from the reservoir 8 into the pressure chambers. In this case, the piston guide portions II and V may not practically contact the respective pistons.

Each of the piston guide portions I–VI has a radially inner surface in which are formed a plurality of grooves 15–20 extending parallel to the axis of the cylinder body and arranged circumferentially at equal intervals. The grooves 15–20 formed in the respective piston guide portions are equal in number with each groove formed in each piston guide portion being axially aligned with the corresponding grooves of the other piston guide portions.

The grooves 15 formed in the piston guide portion I have bottoms that lie in a cylindrical surface having a diameter equal to or smaller than the diameter of the opening 21 of the cylinder body 1 and equal to or greater than the diameter of the cylindrical surface in which the bottoms of the grooves 16 and 17 of the piston guide portions II and III lie.

The grooves 16–20 of the piston guide portions II–VI are straight grooves extending parallel to the axis of the cylinder body 1, and are equal in size and shape to one another.

The cylinder body 1 is formed by casting with a core having ribs corresponding to the grooves 15 of the piston guide portion I inserted therein. The grooves 15 are formed by removing the core later. The grooves 16–20 of the other piston guide portions are formed using e.g. a broach.

Most typically, the primary cups 11 and 13 and pressure cup 14 are formed of a rubber having a hardness of 75–90 Hs. In order to prevent them from getting damaged to such an extent that they are practically unusable, the depth and width of the grooves 16, 18 and 19 of the piston guide portions II, IV and V are preferably determined at about 0.3–0.8 mm and about 0.5–1.2 mm, respectively.

Between the piston guide portions I and II, the latter defining the rear wall of the groove in which is received the primary cup 11, a passage 22 is formed through which the grooves 15 and 16 formed in the piston guide portions I and II, respectively, communicate with the reservoir 8 through a hole 23 formed in the cylinder body 1. Similarly, between the piston guide portions IV and V, the latter defining the rear wall of the groove in which is received the primary cup 13, a passage 24 is formed through which the grooves 18 and 19 formed in the piston guide portions IV and V, respectively, communicate with the reservoir 8 through a hole 25 formed in the cylinder body 1. (The passages 22 and 24 of the embodiment are annular grooves formed in the radially inner surface of the cylinder body 1.)

A plurality of radial through holes 26 are formed in the primary piston 2, arranged circumferentially at equal intervals. Similarly, a plurality of radial through holes 27 are formed in the secondary piston 5, arranged circumferentially at equal intervals. When the pistons 2 and 5 are at their initial, retracted positions of FIG. 1 (i.e. when the pistons 2 and 5 are not being operated), the holes 26 are positioned radially inwardly of the grooves 16 with at least one hole 26 communicating with one of the grooves 16, while the holes 27 are positioned radially inwardly of the grooves 19 with at least one hole 27 communicating with one of the grooves 19. Further, the holes 26 directly communicate at their rear portions with the front portion of the passage 22. Similarly, the holes 27 directly communicate at their rear portions with the front portion of the passage 24. The holes 26 and 27 are preferably round holes because round holes are easy to form and less likely to damage the primary cups 11 and 13.

The passages 22 and 24, through which the holes 26 and 27 communicate with the reservoir 8, are not necessarily annular grooves as shown. But they are preferably annular grooves, because annular grooves are easy to form and can be kept in communication with the through holes 26 and 27 even when the pistons 2 and 5 rotate and the holes 26 and 27 are circumferentially displaced. Their shapes and sizes are thus less limited, so that they can be easily formed.

The numbers, positions and sizes of the holes 26 and the grooves 16 are determined such that at least one of the holes 26 is always in communication with the grooves 16 even if the relative angular positions between the holes 26 and the grooves 16 change due to rotation of the primary piston 2. Thus, if the holes 26 and the grooves 16 are both arranged at circumferentially equal intervals, the number of the holes 26 should not be a multiple or a factor of the number of the grooves 16. For example, if the number of the holes 26 is eight, the number of the grooves 16 should not be 16 because depending on the relative angular positions between the eight holes 26 and the sixteen grooves 16, every two adjacent ones of the grooves 16 may be located between adjacent holes 26, so that none of the grooves 16 may be in communication with any of the holes 26. Also, in order to minimize the possibility of the primary cup 11 getting damaged by the edges of the holes 26 and to more reliably keep at least one of the grooves 16 always in communication with one of the holes 26, the grooves 11 preferably have a relatively small width, e.g. a width smaller than the diameter of the holes 26, and are greater in number than the holes 26.

The numbers, positions and sizes of the holes 27 and the grooves 19 should also be determined in like manners.

The grooves 15–17 of the piston guide portions I–III and the grooves 18–20 of the piston guide portions IV—VI serve as passages for brake fluid when brake fluid is sucked into the pressure chambers through the passages formed around the pistons by elastically deforming the primary cups under the pressure of brake fluid. The grooves 16 of the piston guide portion II and the grooves 19 of the piston guide portion V also serve as passages for brake fluid when brake fluid is sucked into the pressure chambers through the through holes 26 and 27. Since the grooves 16 and 19 are formed in the piston guide portions defining the rear walls of the groove in which the respective primary cups are received, the through holes 26 and 27 can be provided immediately behind the respective primary pistons. Thus, the master cylinder can produce pressure with a short stroke of the pistons from their initial positions. Also, brake fluid can be sucked smoothly from the reservoir without the need to form an annular groove in the outer periphery of either piston, which can damage the primary cups.

When the piston is at the return end of its stroke, the pressure chamber communicates with the reservoir through the through holes formed in the piston, the grooves formed in the rear wall supporting the primary cup, and the passage provided in the rear of these grooves. Thus, the master cylinder is simple in structure and has a smaller number of parts.

With this arrangement, the possibility of the primary cup getting damaged can be minimized. Also, brake fluid can be sucked sufficiently smoothly into the pressure chamber when brake hydraulic pressure is controlled with an electronic control unit.

The passage leading to the reservoir is preferably an annular groove formed in the radially inner surface of the cylinder body because such an annular groove can be formed easily. Also, such an annular groove can be designed more freely.

The number of the grooves formed in the radially inner surface of the rear wall is preferably neither a multiple nor a factor of the number of the radial through holes formed in the piston. Further, the grooves and the through holes are positioned and sized such that at least one of the grooves is always in communication with one of the through holes even when the piston rotates so that brake fluid can be smoothly sucked into the pressure chamber.

The numbers of the grooves and the through holes are preferably determined such that a necessary number of grooves always communicate with the through holes. With this arrangement, it is possible to minimize the diameter of the through holes formed in the piston and thus minimize the stroke of the piston required to seal the holes, without hindering smooth suction of brake fluid.

What is claimed is:

1. A master cylinder comprising a cylinder body having a circumferential groove formed in a radially inner surface thereof, a primary cup received in said groove, a piston inserted in said cylinder body so as to be kept in slide contact with said primary cup, said cylinder body having a rear wall defined by said groove at an axial rear of said groove, said wall supporting said primary cup, said rear wall having a radially inner surface formed with a plurality of grooves, a reservoir, and a passage provided in the rear of said grooves and communicating with said reservoir, said piston being formed with radial through holes corresponding to said grooves, wherein a pressure chamber defined in said cylinder body is adapted to communicate with said reservoir through said radial through holes, said grooves and said passage when said piston is at a return end of its stroke.

2. The master cylinder of claim 1 wherein said passage is an annular groove formed in the inner surface of said cylinder body.

3. The master cylinder of claim 1 wherein the number of said grooves is neither a multiple nor a factor of the number of said radial through holes, and wherein said grooves and said radial through holes are positioned and sized such that at least one of said through holes always communicates with one of said grooves even when said piston rotates.

4. The master cylinder of claim 2 wherein the number of said grooves is neither a multiple nor a factor of the number of said radial through holes, and wherein said grooves and said radial through holes are positioned and sized such that at least one of said through holes always communicates with one of said grooves even when said piston rotates.

5. A master cylinder comprising:
a cylinder body;
a primary piston and a secondary piston both inserted in said cylinder body with said secondary piston provided in front of said primary piston;
said cylinder body having, on its radially inner surface, first, second and third piston guide portions directly in slide contact with and guiding said primary piston, and fourth, fifth and sixth piston guide portions directly in slide contact with and guiding said secondary piston, said third piston guide portion and said sixth piston guide portion being provided in front of said first and fourth piston guide portions, respectively, with said second and fifth piston guide portions being provided between said first and third piston guide portions and between said fourth and sixth piston guide portions, respectively;
a secondary cup and a first primary cup sealing a gap between the radially inner surface of said cylinder body and said primary piston, said secondary cup being provided in the rear of said first piston guide portion, said first primary cup being provided between said second and third piston guide portions with said second piston guide portion serving as a rear support wall for said first primary cup;
a pressure cup and a second primary cup sealing a gap between the radially inner surface of said cylinder body and said secondary piston, said pressure cup being provided in the rear of said fourth piston guide portion, said second primary cup being provided between said fifth and sixth piston guide portions with said fifth piston guide portion serving as a rear support wall for said second primary cup;
each of said first to sixth piston guide portions having a radially inner surface formed with a plurality of grooves extending parallel to an axis of said cylinder body;
a reservoir; and
first and second passages provided in the rear of said grooves of said second and fifth piston guide portions, respectively, so as to communicate with said reservoir;
said primary piston being formed with first radial through holes corresponding to said grooves of said second piston guide portion, said secondary piston being formed with second radial through holes corresponding to said grooves of said fifth piston guide portion;
wherein a first pressure chamber defined in said cylinder body by said primary piston is arranged to communicate with said reservoir through said first radial through holes, said grooves of said second piston guide portion and said first passage when said primary piston is at a return end of its stroke; and wherein a second pressure chamber defined in said cylinder body by said secondary piston is arranged to communicate with said reservoir through said second radial through holes, said grooves of said fifth piston guide portion and said second passage when said secondary piston is at a return end of its stroke.

6. The master cylinder of claim 5 wherein said first and second passages are annular grooves formed in the inner surface of said cylinder body.

7. The master cylinder of claim 5 wherein the number of said grooves formed in each of said first and second rear walls is neither a multiple nor a factor of the number of each of said first and second radial through holes, and wherein said grooves formed in said first and second rear walls and said first and second radial through holes are positioned and sized such that at least one of each of said first and second through holes always communicates with one of said grooves formed in each of said first and second rear walls, respectively, even when said primary piston or said secondary piston rotates.

8. The master cylinder of claim 6 wherein the number of said grooves formed in each of said first and second rear walls is neither a multiple nor a factor of the number of each of said first and second radial through holes, and wherein said grooves formed in said first and second rear walls and said first and second radial through holes are positioned and sized such that at least one of each of said first and second through holes always communicates with one of said grooves formed in each of said first and second rear walls, respectively, even when said primary piston or said secondary piston rotates.

9. A master cylinder comprising a cylinder body a primary cup provided on a radially inner surface of said cylinder body, a piston inserted in said cylinder body so as to be kept in slide contact with said primary cup, said cylinder body having a rear wall supporting said primary cup, said rear wall having a radially inner surface formed with a plurality of grooves, a reservoir, and a passage provided in the rear of said grooves and communicating with said reservoir, said piston being formed with radial through holes corresponding to said grooves, wherein a pressure chamber defined in said cylinder body is adapted to communicate with said reservoir through said radial through holes, said grooves and said passage when said piston is at a return end of its stroke, wherein the number of said grooves is neither a multiple nor a factor of the number of said radial through holes, and wherein said grooves and said radial through holes are positioned and sized such that at least one of said through holes always communicates with one of said grooves even when said piston rotates.

* * * * *